United States Patent
Sosnovsky et al.

(10) Patent No.: US 7,590,714 B1
(45) Date of Patent: Sep. 15, 2009

(54) METHODS AND APPARATUS FOR PROVIDING EXTENSIBLE LIGHTWEIGHT SERVICES IN A DATA STORAGE ENVIRONMENT

(75) Inventors: Stanislav Sosnovsky, Upton, MA (US); Ruben Michel, Hopkinton, MA (US); Ilya Liubovich, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 1340 days.

(21) Appl. No.: 10/750,334

(22) Filed: Dec. 31, 2003

(51) Int. Cl.
*G06F 15/173* (2006.01)
(52) U.S. Cl. .................. 709/223; 719/316; 719/318; 719/330
(58) Field of Classification Search ............... 709/223, 709/203; 715/733; 702/183; 719/316, 318, 719/330
See application file for complete search history.

(56) References Cited

U.S. PATENT DOCUMENTS 6,425,005 B1 * 7/2002 Dugan et al. ............... 709/223
6,664,978 B1 * 12/2003 Kekic et al. ................ 715/733
6,813,587 B2 * 11/2004 McIntyre et al. ........... 702/183

\* cited by examiner

*Primary Examiner*—J Bret Dennison
*Assistant Examiner*—Kyung H Shin
(74) *Attorney, Agent, or Firm*—Chapin IP Law, LLC; Barry W. Chapin, Esq.

(57) ABSTRACT

Conventional development architectures for software system development employ varied invocation and triggering mechanisms for various objects and processes, such as services. Integrating new services tends to impose substantial changes in multiple code objects, requires retroactive testing, and increases the risk of failure. A services architecture in which users of a service seamlessly employ a respective service using only the objects, classes, and entities germane to the service usage provides interprocess module and service entity invocation. Extraneous definitions and functions, such as housekeeping relating to activation and passivation, location (module or component) of the service, and memory allocation, are removed from the user view. The architecture provides for automatic activation in the event components for providing the service have been passivated. Invocation requests are mapped across modules to the appropriate service entities. In this manner, the services architecture provides a seamless user view of the service by handling extraneous functions and allowing the service user to focus on the subscriber rather than the service implementation detail.

34 Claims, 8 Drawing Sheets

METHODS AND APPARATUS FOR PROVIDING EXTENSIBLE LIGHTWEIGHT SERVICES IN A DATA STORAGE ENVIRONMENT

BACKGROUND OF THE INVENTION

In a typical conventional managed information environment, such as a storage area network (SAN) operable to coordinate access to mass storage devices by a set of users, the storage area network interconnects a plurality of storage device nodes and associated interconnection nodes. The storage area network includes a variety of nodes for providing mass storage retrieval services to users, such as storage devices (e.g. disc drive arrays), connectivity devices (e.g. switches and routers), and conventional host computers for executing software components called agents for monitoring and controlling the nodes in the storage area network. The resultant infrastructure, therefore, for monitoring and controlling the storage area network, defines a complex array of nodes and interconnections.

Management of the storage area network infrastructure is a formidable endeavor. The multitude of nodes and interconnections between the various nodes present a substantial monitoring and control task for tracking throughput, identifying bottlenecks, and pinpointing failures, for example. In a typical conventional managed information services network, a network management application, such as a Simple Network Management Protocol (SNMP) based application, for example, assists operators and users in gathering feedback from the network and performing diagnostic activities for isolating problem areas, performing remedial action, and improving efficiency of the conventional network infrastructure.

Complex software systems such as the storage area network often employ a notification, or triggering mechanism in order to notify interested parties of significant occurrences or events, such as failures, diagnostics, and threshold or milestone quantifications, for example. In conventional software systems, predefined or sufficiently automated and seamless service access and invocation may not be available. In languages employed for development of such conventional software systems, such as the C++ programming language, for example, the system design methodology may implement service layers providing support for notification mechanisms. In such a managed information network, notification mechanisms typically inform applications and other managing entities of various occurrences detected by deployed entities in the environment. Often, such services generate notifications in the form of alerts, which a detecting entity reports to a monitoring or responsible entity. The conventional interprocess notification mechanisms typically strive to organize and propagate the alerts in a systematic manner according to a predetermined protocol. The predetermined protocol provides assurances that information in the alerts and corresponding responsive action occurs in a timely and/or effective manner to maintain the conventional managed information environment near peak efficiency.

SUMMARY

In a conventional managed information network environment, notification mechanisms, or services, typically monitor the various nodes and interconnections in the network. Such a network typically includes a large number of nodes, or manageable entities, for performing various operations and services in the network. The manageable entities may include, for example, host nodes, software agent components, storage arrays, interconnection components including routers and switches, and others. The conventional environment employs one or more services to perform or execute certain operations and functions according to a periodic or event driven basis. The service gathers and propagates information and performs functions and operations pertaining to the interconnected manageable entities for ensuring prompt and efficient remedial and/or responsive action to the various significant occurrences in the environment.

In a large conventional managed environment, development efforts often consume substantial time and effort for coordinating the various services throughout the application under development. Adherence to the predetermined protocol encounters consistency issues, staffing education issues, and deployment issues, as such an effort typically involves many engineers of various experience levels. Novice developers may be unfamiliar with a particular service, and may therefore find a particular service cumbersome to implement. Multiple, complex definitions for services and related data increase ramp-up time for new developers, and tend to complicate deployment by incorporating many definitions and related entities in the software build process. For example, a particular developer may require only a single feature of a particular conventional service, yet must inherit service related definitions and classes (i.e. include files) corresponding to a much larger scope of potential service related operations and objects.

In such a conventional software system, executable entities, typically processes, communicate with other executable entities via a conventional interprocess communication mechanism. Such an interprocess communication mechanism conveys messages and other information between the executable entities in the software system. Often, the executable entities operate as a service, in which one executable entity provides a service to another executable entity. The conventional interprocess communication mechanism conveys, or transmits, a request to the service and the service responds with execution of a particular task or operation.

Configurations of the invention are based, in part, on the observation that conventional development architectures for system development, particularly software system development, employ varied invocation and triggering mechanisms for various objects and processes, that provide such services. Accordingly, implementation of additional services involves integrating the added services into existing code modules and notification mechanisms. Such integration requires substantial knowledge of the existing system and results in changes that touch many software objects. Therefore, integrating new services tends to impose substantial changes in multiple code objects, creates substantial retroactive testing, and increases the risk of failure. Mitigating this risk requires developers to be familiar with many aspects of the system affected by the addition of the service, and may require substantial software rebuilds to implement.

Further, the services in the software system provide services to subscribers in a variety of other modules, or components. Such subscribers may be in the same or other processes, thereby placing additional demands on the invocation and triggering mechanism. Deallocation of memory should be from the same pool as the corresponding allocation. Therefore, the system of the invention provides allocation across modules to ensure valid deallocation by deallocating from the same pool. Further, the services themselves typically subdivide service entities into grouping or sets in individual modules or components. The software system may, at times, deactivate certain modules in the interest of conserving processing power and other resources. The service then requires activation prior to processing a service request. Accordingly, invocation of a service involves synchronization and coordination between a number of housekeeping operations, such as module activation and passivation, memory allocation, and multiple instantiations of the executable entities. Such housekeeping details compound the complexity of integrating with a service.

Configurations of the invention substantially overcome the above described shortcomings presented by a software system notification and triggering mechanism by providing a services architecture in which users of a service seamlessly employ a respective service using only the objects, classes, and entities germane to the service usage. Extraneous definitions and functions, such as housekeeping relating to activation and passivation, location (module or component) of the service, and memory allocation, are removed from the user view. The architecture provides for automatic activation in the event components for providing the service have been passivated prior to invocation. Further, invocation requests (messages) are mapped across processes and modules to the appropriate service entities (modules) providing the service. The architecture further supports memory allocations such that tracking and deallocation occur in the corresponding memory pool from which allocation occurred. In this manner, the services architecture provides a seamless user view of the service by handling extraneous and housekeeping functions incidental to the service and allowing the service user to focus on the subscriber (service user) rather than the service implementation detail.

In further detail, the services architecture disclosed herein is a method for interprocess communication in a managed information system, such as a storage area network, that involves receiving a registration from, or on behalf of, a service entity in the managed information system, in which the registration is indicative of a significant occurrence in the managed information architecture, and indicative of the service entity responsive to the significant occurrence. A module server including the service establishes a persistent association of the service entity and the significant occurrence in response to the registration, in which the persistent association is independent of the enablement of the module including the service entity. The persistent association therefore provides a registered service entity known to the module server including the service. The module including the service entity may undergo disablement and reenablement (passivation and activation), and at a successive time, the module receives a notification indicative of the significant occurrence in the managed information architecture.

The module server identifies, via the persistent association, the corresponding registered service entity responsive to the significant occurrence, and if the module including the identified registered service entity is disabled, enables the module including the service entity. Establishing the persistent association involves storing, in a global association table, an indication of the significant occurrence and an indication of the module containing the service entity, in which the global association table is persistently independent of enablement of the module including the service entity, i.e. not volatile with respect to the module including the service entity. The persistent association also includes a local association table, in the module including the service entity, that stores an indication of the significant occurrence and an indication of the corresponding service entity. The module including the service entity then invokes, via the persistent association, the service entity responsive to the significant occurrence, and the service entity performs the operations and functions codified therein.

A class entity, such as a method or publisher, in the same or another module detects the significant occurrence. The class entity is operable to execute instructions in the context of state information provided by the class, and transmits an indication message indicative of the significant occurrence to the service entity via the module server.

Particular configurations of the invention support disabling of the module including the service entity, and selectively enabling, in response to the significant occurrence, the module including the service entity, wherein the persistent association is independent of enabling and disabling of the service entity. Following the selective enabling of the module, the module server enqueues an indication of the significant occurrence in a queue, in which the queue corresponds module containing the service entity. The module then assigns performance of the service entity to a thread corresponding to the queue. A module may have one or more threads depending on the expected demands and throughput. Note, however that the threads should be consistent with the enablement and disablement provided by a thread manager within the module. Therefore, an alternate configuration employing queues at the process level, for example, should synchronize disablement accordingly.

Receiving the registration employs a genericizing reference for identifying the service entity, in which the service entity employs a typecast of the genericizing reference to avoid extraneous references, in which the genericizing reference is further operable for registration of a plurality of service entities, in which each of the service entities are independent of references of other service entities.

In particular configurations, invocation of the service entity occurs in a different executable entity than the significant occurrence, in which the detecting includes transmitting the indication message (i.e. notification) from the process corresponding to the significant occurrence to the module including the service entity corresponding to the significant occurrence. The invocation further includes identifying associated data indicative of the significant occurrence, and assembling an invocation call that includes both a reference to the service entity and a reference to the identified associated data. The module server then executes the referenced service entity in the context of the referenced associated data. Such invocation and execution may further comprise a dispatch command, the dispatch command operative to enqueue multiple invocations to the same service entity, wherein the dispatch command references the associated data via a genericizing reference. Such a genericizing reference is operable to include multiple types of associated data independently of the dispatched service entities employing the associated data.

The enablement of modules in response to service entity invocation corresponds to activation of a corresponding component by an activation mechanism, and disabling corresponds to deactivation, or passivation, of the corresponding component by the activation mechanism. The activation and deactivation operations operable to reduce memory consumption by inactive components and provide selective invocation to maintain availability of the component.

In the particular exemplary configuration, the system of the invention may be deployed in a language such as C++, in which enabling modules corresponds to activation of a corresponding component by an activation mechanism, and disabling corresponds to deactivation of the corresponding component by the activation mechanism. Such activation and deactivation operations are operable to reduce memory consumption by inactive components and provide selective invocation to maintain availability of the component. The enabling and disabling is performed at a level of granularity of the modules, in which each of the modules corresponds to a component and is operable be enabled and disabled by activation and deactivation of the corresponding component.

Such a deployment associates the significant occurrence with a services entity in the native language of the services entity and corresponding subscriber (i.e. C++), and avoids a corresponding definition in an external interface language, in which the external interface language is employed to generate specific code for handling the significant occurrence. A particular external interface language is the Object Management Group Interface Definition Language (OMG/IDL), which, while providing a robust interface for external entities and testing purposes, may contribute to undesirable overhead and footprint requirements.

In alternate configurations, each of the modules is operable to include a plurality of threads, and disabling is performed by a thread manager operable to gracefully terminate each of the threads prior to deactivation. Deactivation in this manner occurs by informing each of the threads of the termination and computing when each thread has attained a termination point.

To allow on-demand component disablement (deactivation, or passivation), the component's threads support cooperative thread cancellation. Integration of an Adaptive Communication Environment (ACE) object, as is known to those of skill in the art, facilitates cooperative thread cancellation. Accordingly, the component framework creates an instance of the ACE_Thread_Manager class in each component. This manager controls all non-ORB (Object Request Broker) threads running within that component. The component framework provides two threading classes (Thread and Task) that seamlessly integrate the component's thread manager, responsive to the activation manager.

The invention as disclosed above is described as implemented on a computer having a processor, memory, and interface operable for performing the steps and methods for interprocess communication in a managed information architecture as disclosed herein. Other embodiments of the invention include a computerized device such as a computer system, central processing unit, microprocessor, controller, electronic circuit, application-specific integrated circuit, or other hardware device configured to process all of the method operations disclosed herein as embodiments of the invention. In such embodiments, the computerized device includes an interface (e.g., for receiving data or more segments of code of a program), a memory (e.g., any type of computer readable medium), a processor and an interconnection mechanism connecting the interface, the processor and the memory. In such embodiments, the memory system is encoded with an application having components that when performed on the processor, produces a process or processes that causes the computerized device to perform any and/or all of the method embodiments, steps and operations explained herein as embodiments of the invention to allow execution of instructions in a computer program such as a Java, HTML, XML, C, or C++ application. In other words, a computer, processor or other electronic device that is programmed to operate embodiments of the invention as explained herein is itself considered an embodiment of the invention.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION

The system of the present invention defines a general, seamless, extensible services architecture operable with a variety of services. The exemplary services architecture disclosed below depicts deployment of services entities and invocation of the services entities via the subscribers containing the services entities. Activation and deactivation of the modules including the services entities occurs automatically, without developer (user) intervention, therefore relieving the developers of designating logic for detecting and controlling activation, or enablement, and passivation, or disablement, of the modules including the respective service entities. Module activation and deactivation, and subscriber invocation to perform the services entities occurs via the service, following definition by the registration, discussed further below.

Particular configurations of the invention provide a method for an extensible services architecture, or infrastructure which localizes the user view of the service to include only relevant definitions and objects employed by each respective developer. Services defined according to the architecture, therefore, require consideration and manipulation of only the pertinent definitions and structures for usage by each developer.

In particular configurations of the invention, the services architecture, or infrastructure, allows a subscriber to subscribe to a services entity invocation upon detection of the significant occurrence. Invocation of the service entity includes only the service specific class definition, in which the infrastructure transparently processes the reporting and invocation. A services entity, corresponding to the subscription, performs responsive processing of the significant occurrence. A developer need only subscribe to a service entity to identify the appropriate significant occurrence, and the module server invokes the services entity with any associated data upon detection. Each particular subscription avoids extraneous definitions and associated files, thereby relieving the developer of burdensome details associated with unrelated service entities. Further, each service entity may have multiple subscribers, in the same or different processes.

Figure 1:
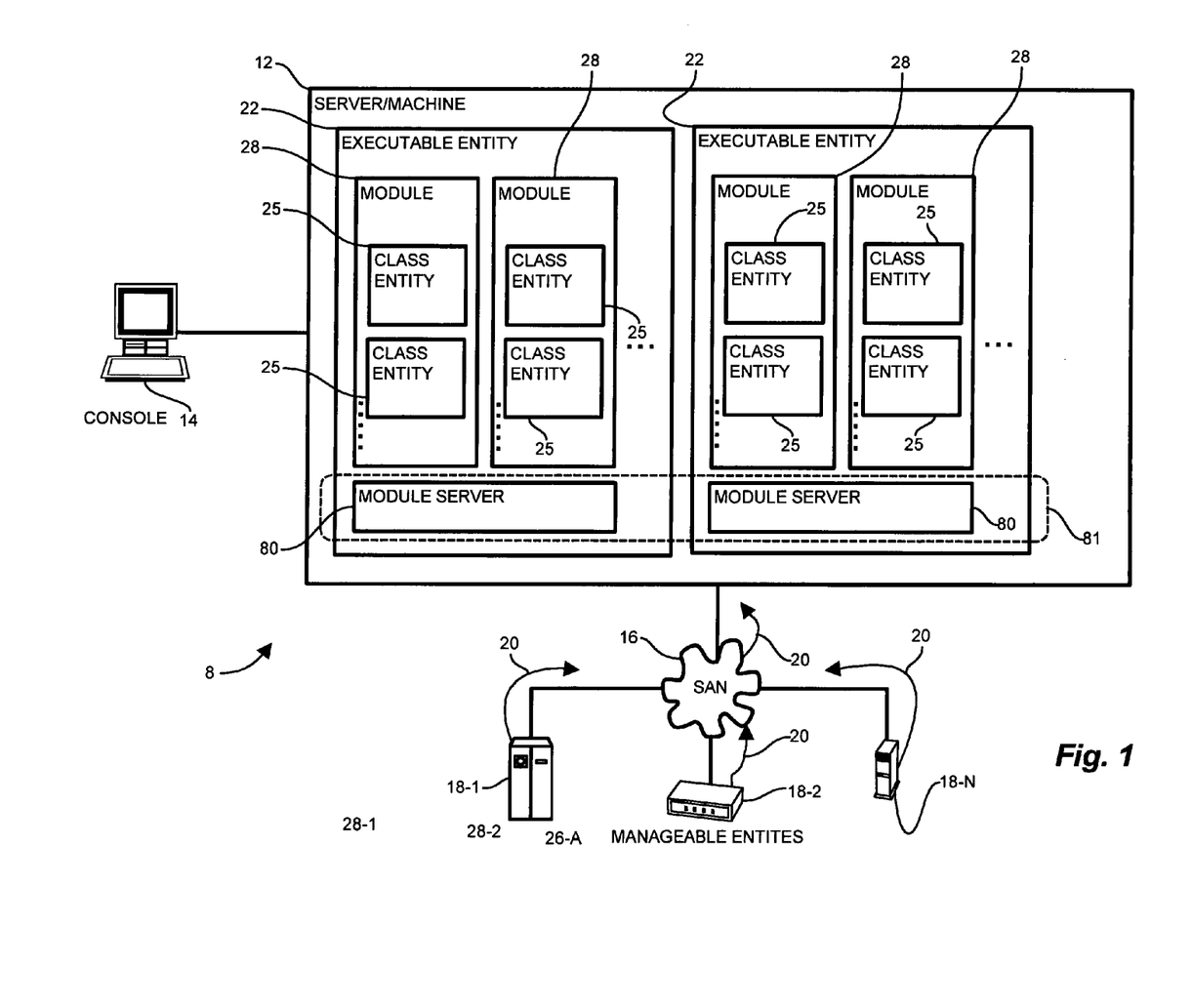
FIG. 1 is a context diagram of an exemplary managed information infrastructure environment including a storage area network and suitable for use with the services architecture of the present invention.

FIG. 1 is a context diagram of an exemplary services architecture 8 including a storage area network (SAN) 16 and suitable for use with the service infrastructure of the present invention. Referring FIG. 1, the services architecture 8 includes a computer system server 12 in communication with a user console 14 and connected to a network 16 such as a storage area network (SAN) 16. The network 16 interconnects a plurality of manageable entities (MEs) 18-1 ... 18-N (18 generally), such as mass storage devices, switching devices, and agents. Each of the manageable entities 18 is operable to send status and other informational messages 20 via the network 16 to the server 12.

The server 12 is a microprocessor based computing device having a memory and interfaces (not specifically shown) and operable for communication with other such devices 12, 18, as is known to those of skill in the art. The server 12 is operable for performing executable entities 22, or processes, each containing one or more modules 28, or components. Each module 28 is operable to include a plurality of class entities 25, which are instantiations of classes defined by a software source code base (not specifically shown). The class entities 25, therefore, represent codified (i.e. coded) sets of attributes and methods (i.e. instructions), which the modules 28 include or inherit. Note that class entities 25 may inherit other class entities 25, therefore defining an inheritance hierarchy (not specifically shown) of the methods and attributes therein. The executable entities 22 include modules 28 according to performance and design considerations, and perform the methods using the attributes therein. Each executable entity 22 typically includes multiple modules 28 according to performance and design considerations of the executable entity footprint (i.e. memory and processing demands) weighed with functionality and robustness of a particular executable entity 22 (process), such as the methods available to that executable entity 22.

The class entities 25 in the services architecture 8 include, in exemplary arrangements of the invention discussed below, subscribers entities, services entities, and publisher entities (described further below) in addition to other class entities 25 for performing (executing) other operations in the scope of a particular executable entity 22. A subscriber entity includes a services entity (discussed further below). In the infrastructure 10, developers select class entities 25 for inclusion in a module 28 for performing a particular task or operation. The developer then select modules 28 for inclusion in the executable entities 22 on the particular server 12, according to performance, throughput requirements and mean time to failure (i.e. reliability considerations). For example, failure or unexpected termination of a module 28 typically terminates the executable entity 22 in which it performs. Accordingly, it may be beneficial to place a suspect module 28 in its own executable entity 22 to avoid disrupting other modules 28 which would otherwise be terminated as well with the executable entity 22. Conversely, each executable entity 22 consumes footprint overhead, so efficiency suggests combining multiple modules 28 per executable entity 22. The performance evaluation may include other considerations.

The architecture 8 (infrastructure) therefore provides for development and deployment of multiple executable entities 22 each having multiple modules 28 for performing particular tasks in the server 12. In such an architecture 8, particularly when a large number of executable entities 22 including many modules 28 are concerned, it is beneficial to insulate individual developers from details of other executable entities 22 and modules 28.

In a large complex system, such as the SAN 16 environment operable to be supported by the architecture 8, many significant occurrences have a need to be identified to trigger responsive operations. Certain class entities 25 (subscribers) have an interest in particular significant occurrences and have services entities 62 including instructions (methods) for responsive action to such a significant occurrence. The class entities 25 in FIG. 1 are software based entities included in a module 28, described further below in FIG. 2.

Figure 2:
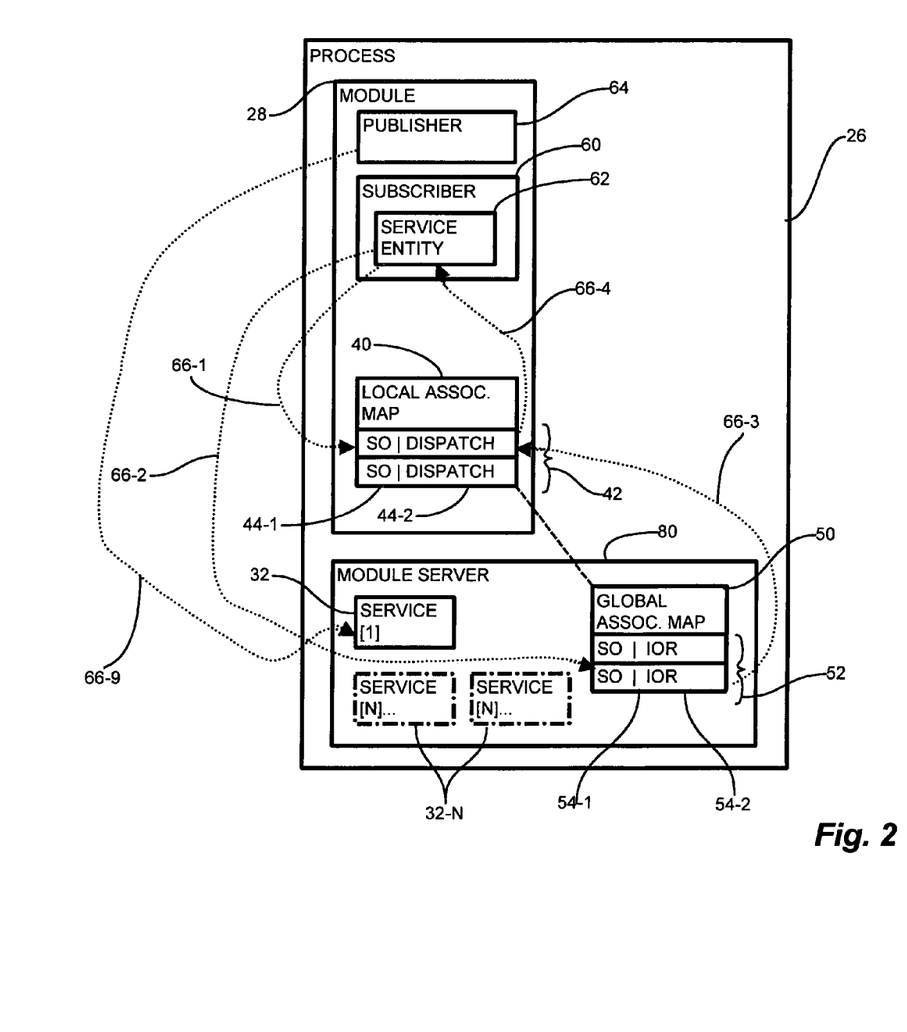
FIG. 2 is a block diagram of a service entity in a module according to the system of the present invention.

FIG. 2 is a block diagram of a services entity in a module according to the system of the present invention. Referring to FIG. 2, in an exemplary configuration, illustrative of a single services entity 62, the architecture includes the services entity 62 in a hosting subscriber 60. As services entities 62 are methods corresponding to a sequence of steps, or instructions (i.e. code), the services entities 62 generally have no state outside of a hosting subscriber 60. The subscriber 60, also having sequences of instructions, is typically the class entity 25 which registers a significant occurrence for invoking the services entity 62 upon such occurrence, discussed further below. In the exemplary configuration, the subscriber 60 is the class entity 25 which includes the corresponding services entity 62, and which registers the same, however alternate configurations may allow significant occurrences to be registered by another class entity 25. The class entities 25 also include publishers 64. The publishers may detect and send the notification of the significant occurrence to the service 32. Alternatively, significant occurrences may be triggered by operating system triggers such as interrupts, and faults, as in the case of timers, discussed further below. Therefore, the general architecture 8 disclosed in FIG. 1 depicts deployed class entities 25 which may, in particular configurations of the services architecture 8, be a subscriber 60, services entity 62 (i.e. handler), publisher 64 as in FIG. 1 or other user software entity 25.

A module 28 includes one or more subscribers 60. Each module 28 also includes a local association map 40 including entries 42 for subscribers 60 and service entities 62 in the module 28, shown by dotted line 66-1. Such a module 28, also known as a component in particular deployment environments such as a C++ environment, is operable for enablement and disablement as a unit including each subscriber 60 therein. Therefore, enablement and disablement, (i.e. activation and passivation) discussed herein refers to a particular module 28 and all included subscribers 60.

A process 26 includes one or more modules 28, and a module server 80. The module server 80 includes one or more services 32, supporting the modules 28 in the process 26, and a global association map 50, operable to store association entries 52 for each module 28 in the process 26. The module server 80 is operable to store a range of services 32-N, in accordance with the services architecture discussed further below, as shown by partially dashed lines around services 32-N. In particular, the module server 80 is adapted to support services 32 including an event service and a timer service, as disclosed in copending U.S. patent applications entitled "SYSTEM AND METHODS FOR EVENT SERVICES," (U.S. patent application Ser. No. 10/750,227) and "METHODS AND APPARATUS FOR A TIMER EVENT SERVICE INFRASTRUCTURE," (U.S. patent application Ser. No. 10/750,413) respectively, both assigned to the assignee of the present application and filed concurrently with the present application, incorporated herein by reference in entirety.

Further, the combination of these two services 32, the timer service and the event service, may provide substantial processing capability and efficiency: the timer service 32 keeps track of time on behalf of a specific subscriber 60, which may publish an event using the event service 32. It should be noted that the exemplary configuration disclosed herein employs a C++ development environment. In such an environment, the description herein as applied to the software entities processes 26, module 28 (i.e. components), subscriber 60, and services entity 62 employ technically operative language within the C++ development environment. These entities interoperate according to certain principles and deployment details according to the C++ language.

Specifically, processes 26 include one or more modules 28, which the module server disables, or passivates, as a whole. Each module 28 includes one or more subscribers 60 (a subset of class entities 25), which are instantiated within the module 28 and may occupy several locations in memory as separate instantiations. The services entities 62 are methods invoked, or referenced by the subscribers 60. The services entities 62 represent, in the exemplary configuration, methods including only sequences of instructions of reentrant code located at a particular position in memory and invoked by a plurality of instantiated subscribers 60. Accordingly, in the C++ development environment, a particular services entity 62 occupies a logical existence only in the context of an instantiated, or corresponding, subscriber 62, as the description herein makes clear. Alternate implementation and deployment platforms may employ alternate invocation and instantiation practices, such as instantiating a services entity 62 in entirety within the address space of each instantiated subscriber 60.

A particular service 32 activates a module 28 via the corresponding module server 80 as follows: The module's 28 DLL is first loaded into the module server 80; next, a servant factory, provided by the DLL, creates the module's servant; finally, that servant incarnates the module's CORBA object. Conversely, a module 28 (component) is passivated or deactivated by etherealizing the CORBA object and unlinking the module's DLL from the component server.

Figure 3:
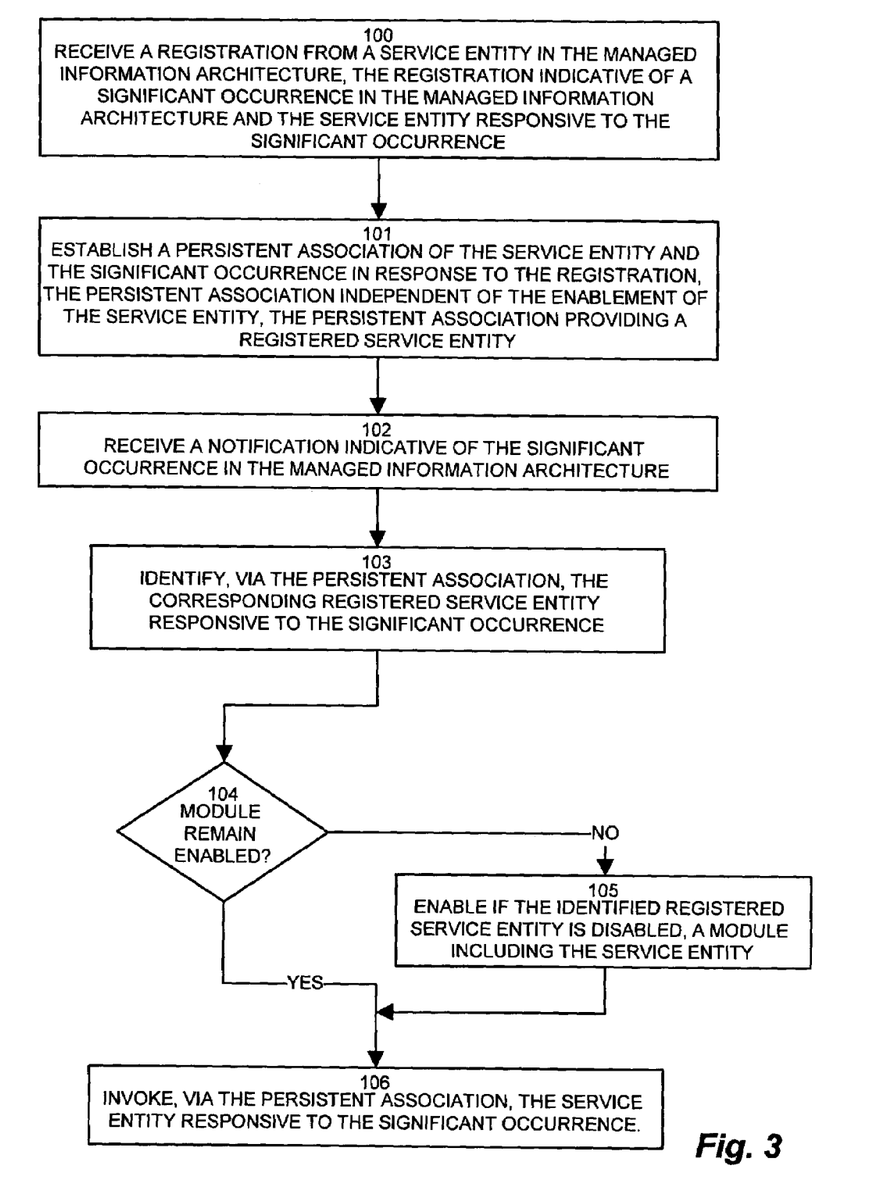
FIG. 3 is a flowchart of service subscription and invocation as described herein.

FIG. 3 is a top level flowchart of the system of the present invention depicting the method for interprocess communication in a managed information architecture. Referring to FIGS. 1, 2 and 3, the module server 80 receives a registration from a service entity 62 in the managed information architecture 8, in which the registration is indicative of a significant occurrence in the managed information architecture 8 and the service entity 62 is responsive to the significant occurrence, as depicted at step 100.

In response, the module server 80 establishes a persistent association of the service entity 62 and the significant occurrence in response to the registration. The persistent association independent of the enablement of the service entity 62, and therefore the persistent association provides a registered service entity 62 which survives disablement of the module 28 in which it resides, as depicted at step 101 and discussed further below.

At a successive point in processing by the server 12, the module server 80 receives a notification indicative of the significant occurrence in the managed information architecture, as depicted at step 102. The notification comes from a class entity 25 designated with detection of the significant occurrence, typically a user entity 25 such as the publisher 64, which performs polling or interrupt driven assessment of various aspect of the server 12, such as monitoring managed entities (MEs) 18.

The module server 80 identifies, via the previously generated persistent association, the corresponding registered service entity 62 responsive to the significant occurrence, as depicted at step 103. The persistent association is a set of tables 40, 50 for indexing and traversing the detected, or published, significant occurrence from the detecting class entity 25 back to the registered service entity 62 adapted to be responsively invoked as a result of the significant occurrence.

At step 104, the module server 80 performs a check to determine if the module including the service entity is active (enabled), and enables, if the identified registered service entity 62 is disabled, the module 28 including the service entity 62, as depicted at step 105. Following steps 104 and 105, the module 28 has attained an enabled state, and accordingly, the module server 80 invokes, via the persistent association, the service entity 62 responsive to the significant occurrence, as disclosed at step 106. The service entity 62 is typically a method in a particular source language having instructions responsive to the significant occurrence, and is invokable by any suitable method, such as via a direct execution transfer address (i.e. entry point), or by more elaborate methods such as multi threaded queues and/or other multi-processing methods, discussed further below.

Figure 4:
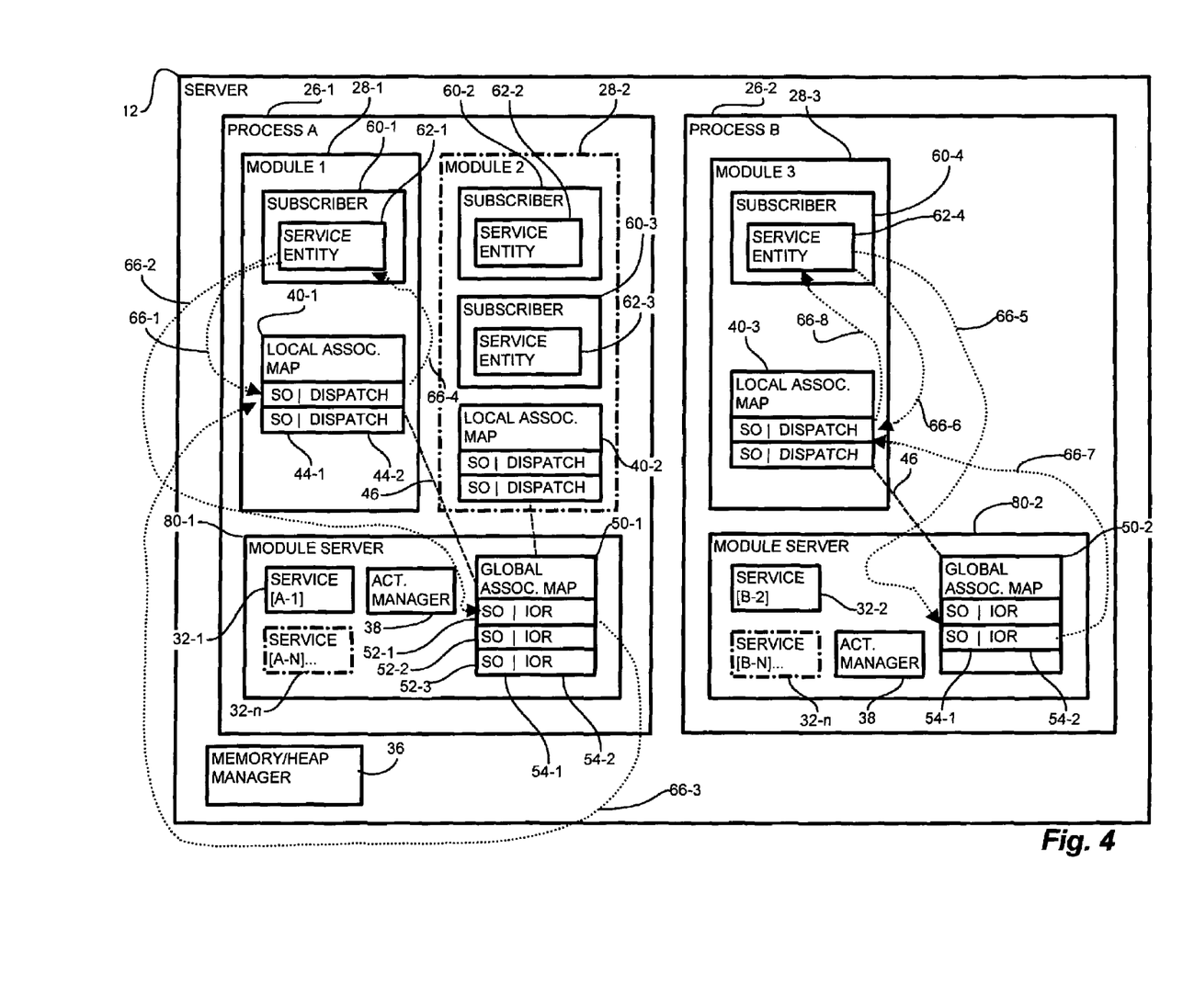
FIG. 4 is a block diagram of the services architecture as in FIG. 2 in a server in the managed information environment of FIG. 1 employing multiple service subscribers and service entities.

FIG. 4 is a block diagram of a service 32 in a server 12 in the managed information architecture 8 of FIG. 2 employing multiple subscribers 60 and services entities 62. Referring to FIGS. 4 and 2, in a particular exemplary configuration of the invention, the server 12 includes the processes 26A (process A) and 26B (process B) as executable entities 22. Process A includes modules 28-1 and 28-2, and process B includes module 28-3 (28 generally). In the particular exemplary configuration, the modules 28 are components according to a deployment language such as C++, as is known to those of skill in the art. Each service includes class entities 25 shown by dotted lines 30, and includes the local service 32-N residing in each module 28, shown as instantiations 32-1 . . . 32-3 (32 generally), a shared memory portion 34, a memory/heap manager 36 and an activation manager 38.

As shown above, the local association map 40 resides in each module 28, as will be discussed further below. Each instantiation 32-1 . . . 32-3, therefore, includes a local association map 40 having entries 42. Each local association map 40 entry 42 includes the attributes: significant occurrence 44-1 and dispatch command 44-2. The global association map 50 including the attributes significant occurrence 54-1 and Interoperable Object Reference (IOR) 54-2, tracks each of the entries 42 in the local association map 40 by the respective significant occurrence (SO) 44-1 and 54-1, shown by dotted lines 46.

Each of the modules 28 includes class entities 25, specifically subscribers 60 and services entities 62. Each subscriber 60 employs the module server 80 for services 32 includes at least one services entity 62. Specifically, subscribers 60-1 . . . 60-4 include services entities 62-1 . . . 62-4, respectively. Publishers 64 comprise publisher instantiations 64-1 . . . 64-3, and are the class entities 25 responsible for detection and notification of the significant occurrence. Therefore, the modules 28 include subscribers 60 to a significant occurrence, shown by entries 52, which include services entities 62, which are instructions (methods) responsive to the significant occurrence, identified by attribute fields 44-1 and 54-1, which the respective service 32 triggers upon detection of the corresponding significant occurrence 44-1 and 54-1.

In operation, the subscriber 60-1, for example, including the services entity 62-1, registers for a particular significant occurrence recognized by a service 32. The subscription creates an entry 42 in the local association map 40, shown by arrow 66-1, containing the association of the significant occurrence 44-1 and corresponding services entity via a dispatch command 44-2, described further below. The subscription also creates another entry 52 in the persistent association map 50, associating the significant occurrence 54-1 with the IOR 54-2 identifying the subscribing module 60-1, as shown by dotted line 66-2. Therefore, the significant occurrence 54-1 also establishes a mapping from the persistent association map 50 to the module 28-1-1 via the IOR 54-2, shown by the dotted line from the local association map 40 of the referenced module 28-1 to the subscriber 60-1 and corresponding services entity 62-1 via the local dispatch command 44-2, shown by dotted line 66-4. An analogous relation in process B 26-2 exists from the services entity 62-4 to the global association map 50-2, shown by arrow 66-5, and from the services entity 62-4 and corresponding subscriber 60-4 to the local association map 40-3, shown by dotted line 66-6. Further, the handler 62-4 invocation is shown from the IOR 54-2, via the significant occurrence 54-1, to the subscribing module 28-3 by dotted line 66-7, and from the local association map 40-3 to the services entity 62-4 and corresponding subscriber 60-4, shown by dotted line 66-8. Upon the detection of the significant occurrence, typically by a publisher 64, the publisher sends a notification to the server 32, as shown by dotted line 66-9. Such notification may also be by other mechanisms, such as operating system primitives via a timer mechanism, as discussed above. The significant occurrence may be referenced in the association tables 40, 50 by any suitable identifier, such as a timer name or event ID, as in the exemplary configurations discussed in the copending applications cited above, or other identifier as applicable to the service 32 and the service entities 62.

FIGS. 5-8 are a flowchart of a service for interprocess communication by subscribing to and handling a significant occurrence via a service entity in the system of the present invention. Such a services oriented development infrastructure is applicable, in particular configurations, to the timer service and event service as disclosed in the copending patent application referenced above, and in alternate configurations operable in accordance with an event or message driven interprocess messaging, communication, and activation environment such as the SAN environment 8 or other services based environment. Referring to FIGS. 2 and 5-8, the mechanism for interprocess communication in the exemplary managed information architecture 8 includes receiving a registration from a service entity 62 in the managed information architecture 8, the registration indicative of a significant occurrence in the managed information architecture 8 and the service entity 62 responsive to the significant occurrence, as shown at step 200. Such significant occurrences may be an informational warning, a critical failure, or a timer or an event, such as in the cited copending applications cited above, or other informational item for communication from one class (processing) entity 25 to another.

Figure 5:
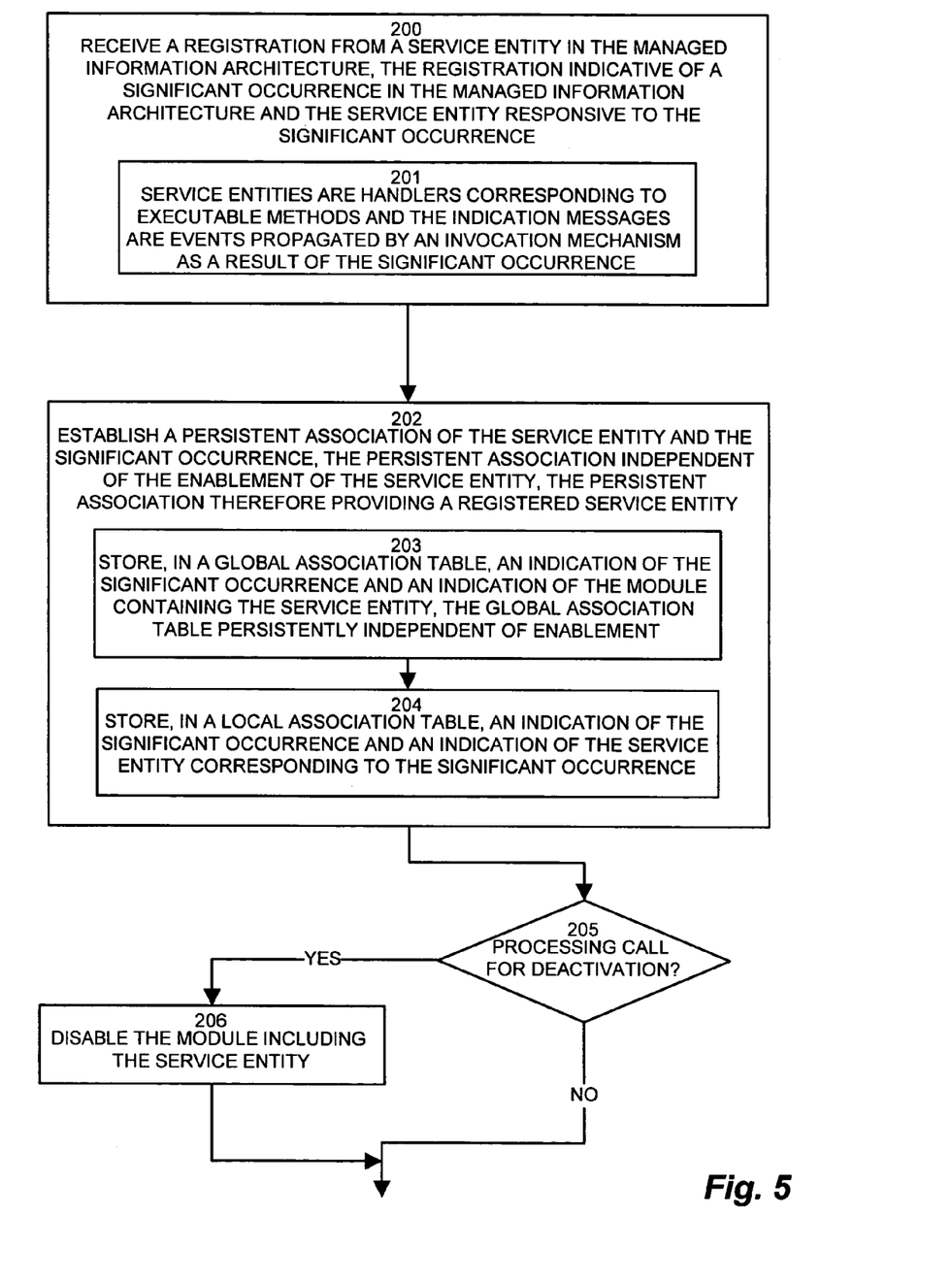
FIGS. 5-8 are a flowchart of providing and invoking a service as in FIG. 3 in greater detail according to the system of the present invention.

At step 201, in particular configurations, service entities 62 are handlers corresponding to executable methods and the indication messages are events propagated by an invocation mechanism as a result of the significant occurrence. In a particular implementation according to the C++ programming language, the handlers are methods in subscribers 60, or class entities 25, in which the handler represents a stateless set of instructions. Such handlers execute in the context of the state (local variables and attributes) of the subscriber 60 to which they are a part of. Depending on the implementation mechanism employed, stateless handlers may be common to several subscribers 60 and reentrantly referenced from several instantiations of stateful subscribers 60, each in a particular module 28.

The module server 80 establishes a persistent association of the service entity 62 and the significant occurrence in response to the registration, as depicted at step 202. The persistent association is independent of the enablement of the service entity 62, therefore allowing the module server 80 to enable and disable modules 28 according to other processing selections and optimizations, determinable by the executing class entities 25. The persistent association therefore provides a registered service entity 62 that is invokable upon detection of the significant occurrence, as described further below.

At step 203, establishing the persistent association includes storing, in a global association table 50, an indication of the significant occurrence and an indication of the module 28 containing the service entity 62. The global association table 50 is persistently independent of enablement of the module 28 including the service entity 62 corresponding to the significant occurrence. Thus, the global association table 50 identifies the service entity 60 and module 28 corresponding to the significant occurrence. The module server 80 identifies the module 28 by IOR 54-2, providing a specific reference to the particular module 28 including the service entity 62 for invocation.

Establishing the persistent association further includes storing, in a local association table 40, an indication of the significant occurrence and an indication of the service entity 62 corresponding to the significant occurrence, as depicted at step 204. The local association table 40 includes the significant occurrence identity 44-1, and a statement 44-2 for invoking the service entity 62. In the particular exemplary configuration, the statement 44-2 is a dispatch command, discussed further below, although alternate mechanisms, such as an execution location or address, are employable.

In particular implementations, including service entities in C++, associating an identity of the significant occurrence 44-1 with a service entity 62 occurs in a native language (i.e. C++) of the service entity 62 and corresponding subscriber 60 (registrant class entity 25), and avoids a corresponding definition in an external interface language. Such an external interface language is adapted for generating additional code for support and testing operations, and in particular configurations the external interface language is the Object Management Group Interface Definition Language (OMG/IDL), as is known to those of skill in the art.

Figure 6:
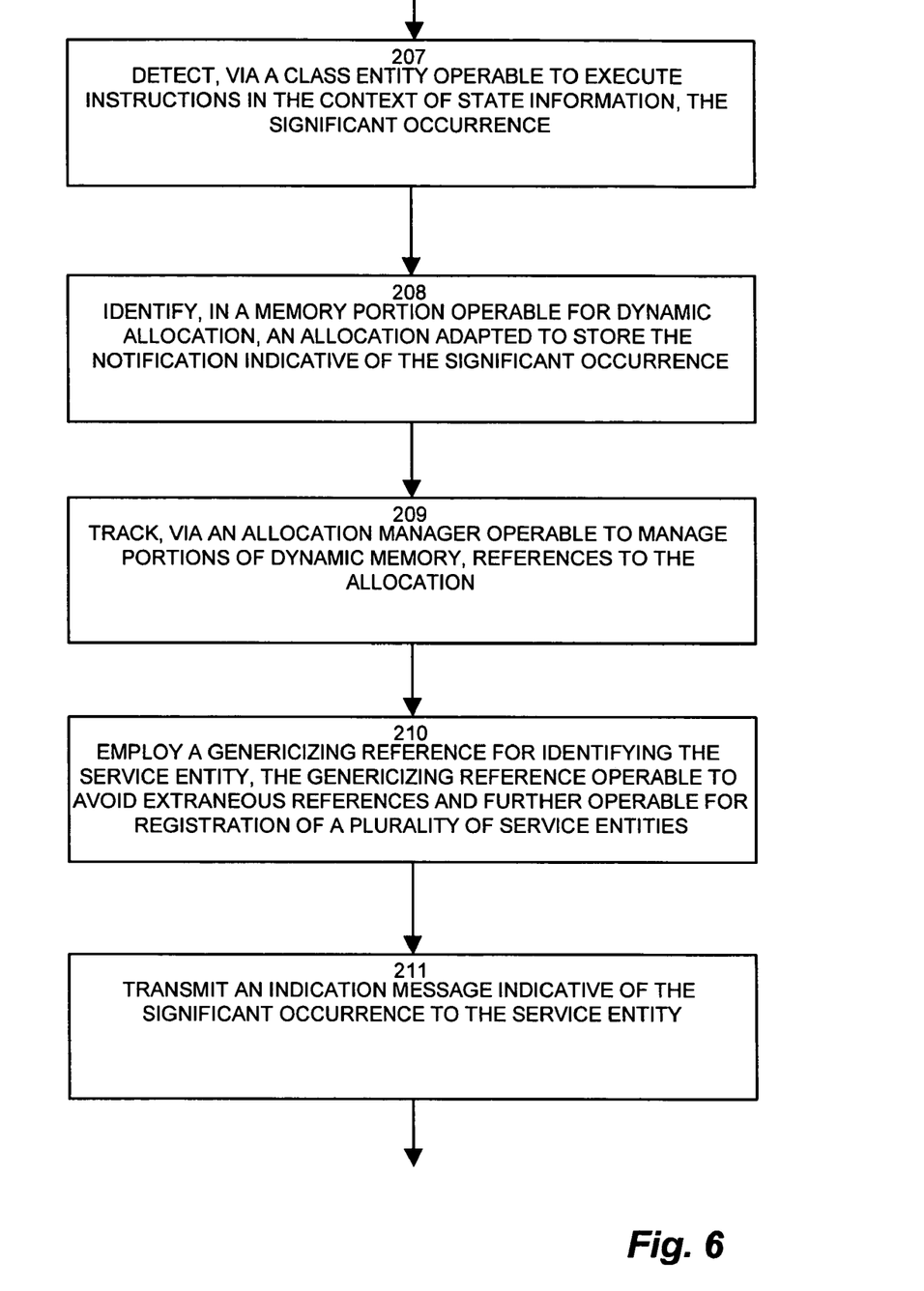

As the module server 80 independently enables and disables the modules 28 without disrupting the persistent association provided by the local and global association tables 40,50, the module server 80 performs a check during successive processing to determine if the module 28 is to be disabled, as depicted at step 205. If the execution of the various class entities 25 in the process 26 indicate that disablement is appropriate for the module 28, then at step 206 the module server 80 disables the module 28 including the service entity 62, as shown at step 206, and illustrated by the partially dashed line around module 28-2.

As normal server 12 processing continues, a class entity 25 detects a registered significant occurrence for which a service entity 62 has been defined, as depicted at step 207. Such a class entity 25 is an entity residing in a module 28 and having instructions for observing the particular significant occurrence. In particular implementations, the class entity 25 may be an event publisher, operable to publish an event, as described in the copending patent application described above. The class entity 25 is operable to execute instructions in the context of state information contained in the module 28, and includes gathering related data clarifying the significant occurrence.

The memory/heap manager 36, in response to detection of the significant occurrence by the class entity 25, identifying, in a memory portion operable for dynamic allocation, an allocation adapted to store the notification indicative of the significant occurrence, as depicted at step 208. The allocation typically contains a record or struct for the clarifying data, and is allocated from a heap or other dynamic memory structure visible to the detecting class entity 25 and to the service entity 62 which is the ultimate receiver of the clarifying data. The memory/heap manager 36 is operable to manage portions of dynamic memory, and tracks references to the allocation for subsequent disposal of the allocation, as depicted at step 209.

The registration of the significant occurrence employs a genericizing reference for identifying the service entity 62, in which the genericizing reference is operable to avoid extraneous references and further operable for registration of a plurality of service entities 62, such that each of the service entities 62 is independent of references of other of the plurality of service entities 62, as disclosed at step 210. The genericizing reference may be a void* to the allocation of the clarifying data, which may be typecast accordingly by the service entity 62, thus avoiding strong typing which might preclude compilation without explicit definitions (i.e. C++ included files) defining specific records or structs of the clarifying data. Inclusion of such clarifying data may require inclusion of clarifying data by service entities 62 which may not directly need or use such definitions, thus complicating implementation.

In further detail, strong typing expects explicit type definitions for each invocation having a different parameter type. Therefore, in the exemplary configuration, the dispatch command would be replicated (i.e. coded) separately for each service entity for invocation. In the present configuration, the dispatch command employs the local association map for parameters to the service entity and the associated clarifying data. The genericizing reference provided by the void* suppresses strong type checking which may be triggered from populating the dispatch command with the local association table entries, since each entry may refer to a different service entity, and having a different associated clarifying data type. In the exemplary implementation, the genericizing reference is a C++ void*, and is integrated with the CORBA mechanism for activation and invoking the service entities. Alternate configurations may employ other genericizing references having alternative typing checks. In other words, the present exemplary configuration employs the genericizing reference so as to implement the CORBA call of the service entity in a manner not dependent on type of the associated data corresponding to the specific service entity.

The detecting entity then transmitting an indication message indicative of the significant occurrence to the service entity 62, as depicted at step 211. Such an indication message may be in the form of a method invocation, and is handled by the module server 80 of the detecting class entity 25, which may or may not be the same module server 80 corresponding to the service entity 62 responsive to the significant occurrence.

Figure 7:
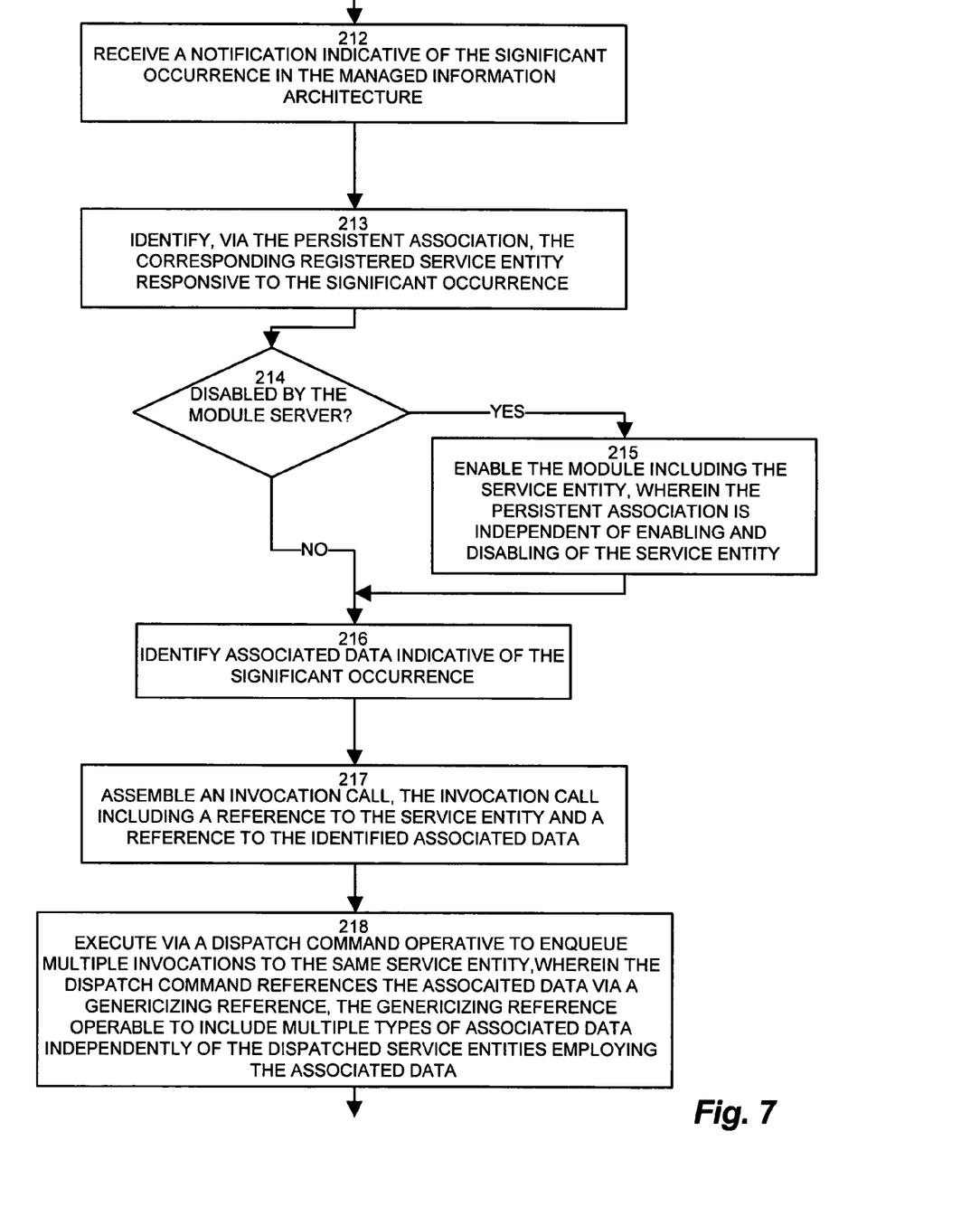

The designated service 32 in the module server 80 of the detecting class entity 25 receives the notification indicative of the significant occurrence in the managed information architecture 8, as shown at step 212. Note that this may be the same module server 80 as the service entity 62, if both are in the same module 28. In such an instance, the global association map 50 is not required and may be omitted for efficiency, if all persistent associations are within the same module 28. Otherwise, the detecting module server 80 communicates with the invoking module server as follows.

The module server 80 identifies, via the persistent association in the global association table 50 and the local association table 40, the module and corresponding registered service entity responsive to the significant occurrence. The module server 80 performs a check, as depicted at step 214, to determine if the module 28 corresponding to the significant occurrence is disabled. If so, at step 215, the module server electively enables, in response to the significant occurrence, the module including the service entity, since the persistent association is independent of enabling and disabling of the service entity 28 and corresponding module 28.

The invoking module server 28 identifying associated clarifying data indicative of the significant occurrence, as stored in the allocation by the memory/heap manager 36, disclosed at step 216. The module server 80 will pass the associated data via the genericizing reference in the invoking dispatch call. Accordingly, at step 217, The module server 80 assembles an invocation call, the invocation call including a reference to the service entity and a reference to the identified associated data. The reference to the service entity 62 includes an execution location (address) within the module at which invocation begins. The module server 80 typically maintains a relative offset within the module 28 such that the execution location relative to the beginning of the module 28 remains at a constant offset throughout disablement and reenablement, thus providing a consistent base from which to determine the invocation reference. The module server also determines the reference to the associated data from the memory/heap manager 36 allocation.

The module server 80 populates a dispatch command with the service entity 62 reference and the associated data reference, as depicted at step 218. The dispatch command is operative to enqueue multiple invocations to the same service entity, in which the dispatch command references the associated data via a genericizing reference operable to include multiple types of associated data independently of the dispatched service entities employing the associated data. Therefore, the dispatch command 44-2 passes a typecast reference to the associated data which the service entity 62 may cast to the appropriate type, hence avoiding burdening the dispatch command with strong typing failures.

Figure 8:
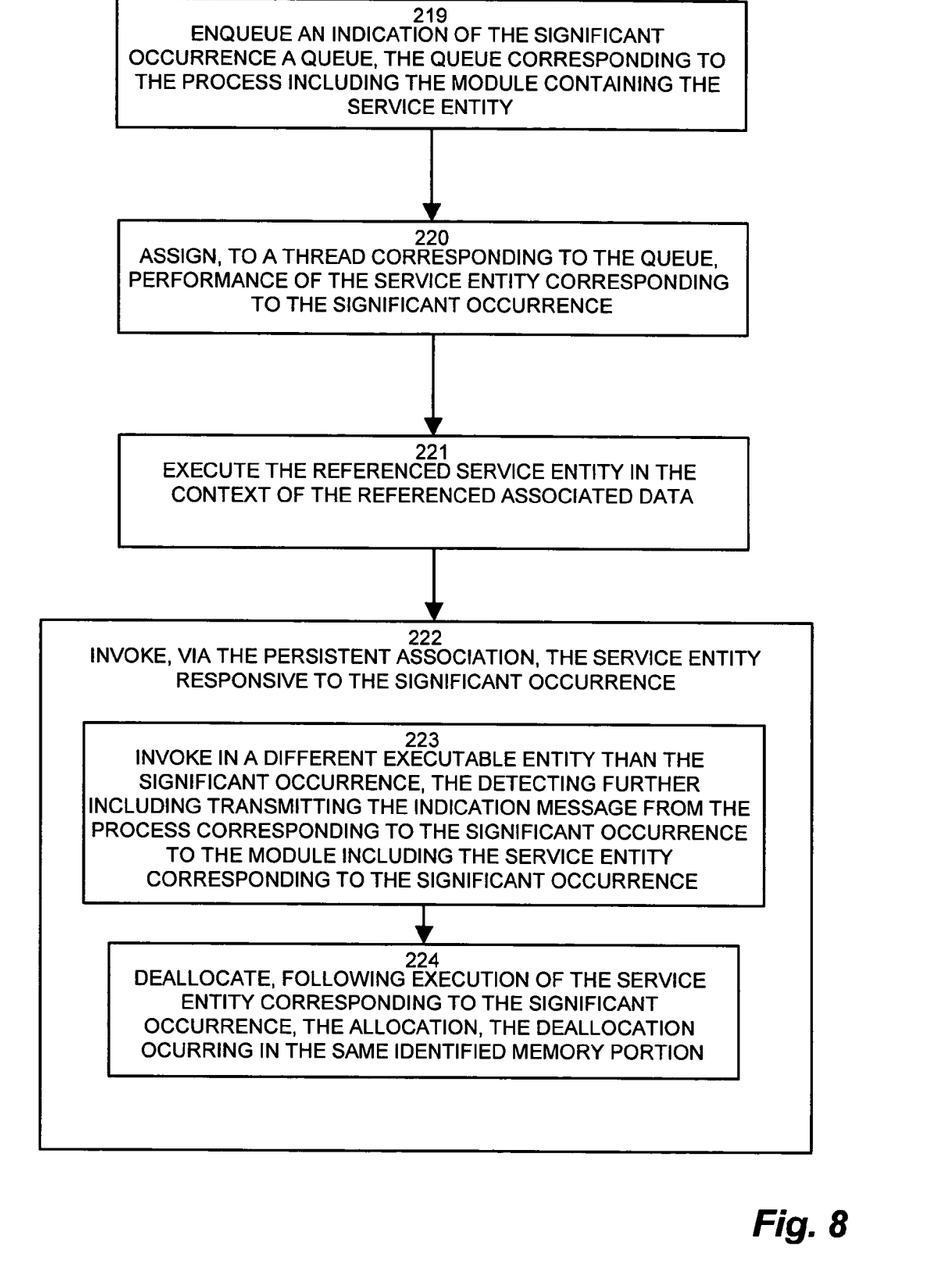

At step 219, the dispatch command enqueues an indication of the significant occurrence a queue, in which the queue corresponds to the module containing the service entity and is operable for multi threaded operation, as is known to those of skill in the art. The module server 60 assigns the queued invocation request to a thread corresponding to the queue, for performance of the service entity corresponding to the significant occurrence, as depicted at step 220.

The assigned thread dequeues and executes the queued service entity in the context of the referenced associated data within the execution module 28, as depicted at step 221. Accordingly, at step 222, the module server 28 invokes, via the persistent association (i.e. local association map 40), the service entity responsive to the significant occurrence. As indicated above, invocation may occur in a different executable entity than the significant occurrence, such that the previous detecting included transmitting the indication message from the process corresponding to the significant occurrence to the module including the service entity corresponding to the significant occurrence, as depicted at step 223.

The dispatched service entity 62 thereby completes the operations responsive to the significant occurrence. Following execution of the service entity corresponding to the significant occurrence, the memory/heap manager 36 deallocates the allocation of the associated clarifying data, ensuring that the deallocation occurs in the same identified memory portion via the tracking of the references, as depicted at step 224.

As indicated above, the received registration employs a genericizing reference for identifying the service entity (handler), in which the genericizing reference is operable to avoid extraneous references and further operable for registration of a plurality of handlers, each of the handlers independent of references of other of the plurality of handlers. In the exemplary configuration, the genericizing reference is a generic pointer (i.e. void*) which the module server 80 typecasts to a class or object type corresponding to the significant occurrence and corresponding notification.

The services architecture disclosed herein may encompass a variety of alternate deployment environments. In a particular configuration, the exemplary SAN management application discussed may embodied in the EMC Control Center (ECC) application, marketed commercially by EMC corporation of Hopkinton, Mass., assignee of the present application.

Those skilled in the art should readily appreciate that the programs and methods for method for interprocess communication via the services architecture as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable object or as a set of instructions embedded in a carrier wave. Alternatively, the operations and methods disclosed herein may be embodied in whole or in part using hardware components, such as Application Specific Integrated Circuits (ASICs), state machines, controllers or other hardware components or devices, or a combination of hardware, software, and firmware components.

While the system and method for interprocess communication via the services architecture has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A method for interprocess communication in a managed information architecture comprising:
    identifying a module server stored in memory;
    receiving a registration from a service entity in the memory in the managed information architecture, the registration indicative of a significant occurrence in the managed information architecture and the service entity responsive to the significant occurrence;
    establishing a persistent association of the service entity and the significant occurrence in response to the registration, the persistent association providing a registered service entity, further including storing, in a global association table, and indication of the significant occurrence and an indication of the module containing the service entity, the global association table persistently independent of enablement of the module including the service entity corresponding to the significant occurrence;
    receiving a notification message indicative of the significant occurrence in the managed information architecture;
    identifying, via the persistent association, the corresponding registered service entity responsive to the significant occurrence, the persistent association independent of enabling and disabling of the service entity;
    enabling, if the identified registered service entity is disabled, a module including the service entity to activate the service entity; and
    invoking, via the persistent association, the service entity responsive to the significant occurrence, the persistent association being defined by a set of tables including the association, the set of table for traversing the published significant occurrence from the detecting class entity to the service entity to be invoked as a result of the significant occurrence, at least one of the set of tables being a persistent table, the persistent table remaining active beyond the activation of the service entity.

2. The method of claim 1 further comprising
    detecting, via a class entity operable to execute instructions in the context of state information, the significant occurrence, and
    transmitting an indication message indicative of the significant occurrence to a module server operable to invoke the service entity.

3. The method of claim 1 further comprising
    disabling the module including the service entity; and
    selectively enabling, in response to the significant occurrence, the module including the service entity, wherein the persistent association is independent of enabling and disabling of the service entity.

4. The method of claim 1 wherein, following selectively enabling:
    enqueuing an indication of the significant occurrence a queue, the queue corresponding to the process including the module containing the service entity; and
    assigning, to a thread corresponding to the queue, performance of the service entity corresponding to the significant occurrence.

5. The method of claim 1 wherein the received registration employs a genericizing reference for identifying the service entity, the genericizing reference operable to avoid extraneous references and further operable for registration of a plurality of service entities, each of the service entities independent of references of other of the plurality of service entities.

6. The method of claim 1 wherein the invoking occurs in a different executable entity than the significant occurrence and wherein the detecting further comprises transmitting the indication message from the process corresponding to the significant occurrence to the module including the service entity corresponding to the significant occurrence.

7. The method of claim 1 wherein invoking further comprises:
    identifying associated data indicative of the significant occurrence;
    assembling an invocation call, the invocation call including a reference to the service entity and a reference to the identified associated data; and
    executing the referenced service entity in the context of the referenced associated data.

8. The method of claim 7 wherein the executing further comprises a dispatch command, the dispatch command operative to enqueue multiple invocations to the same service entity, wherein the dispatch command references the associated data via a genericizing reference, the genericizing reference operable to include multiple types of associated data independently of the dispatched service entities employing the associated data.

9. The method of claim 1 further comprising:
    identifying, in a memory portion operable for dynamic allocation, an allocation adapted to store the notification indicative of the significant occurrence;

tracking, via an allocation manager operable to manage portions of dynamic memory, references to the allocation; and deallocating, following execution of the service entity corresponding to the significant occurrence, the allocation, the deallocation occurring in the same identified memory portion.

10. The method of claim 1 wherein establishing the persistent association further comprising storing, in a local association table, an indication of the significant occurrence and an indication of the service entity corresponding to the significant occurrence.

11. The method of claim 1 wherein the service entities are handlers corresponding to executable methods and the indication messages are events propagated by an invocation mechanism as a result of the significant occurrence service entity.

12. The method of claim 1 wherein associating an identity of the significant occurrence with a service entity occurs in a native language of the service entity and corresponding subscriber, and avoids a corresponding definition in an external interface language, the external interface language for generating additional code, the additional code adapted for support and testing operations.

13. The method of claim 12 wherein the external interface language is the Object Management Group Interface Definition Language (OMG/IDL).

14. The method of claim 1 wherein the persistent association is defined by a set of tables including the association, the set of tables for traversing the published significant occurrence from the detecting class entity to the service entity to be invoked as a result of the significant occurrence, at least one of the set of tables being a persistent table, the persistent table remaining active beyond the activation of the service entity.

15. The method of claim 1 further wherein the global association table correlates the significant occurrences to the interoperable object reference (IOR) of the module containing the service entity, further comprising a local association table, the local association table correlating the significant occurrence to the handler responsive to the significant occurrence.

16. The method of claim 15 wherein establishing the persistent association further comprises storing, in the local association table, the indication of the significant occurrence and an indication of the service entity corresponding to the significant occurrence, the local association table and the global association table collectively defining the persistent association.

17. A method for invocation of subscribers comprising:

receiving a subscription associative of a service entity and a significant occurrence, the service entity having instructions operative for executing and completing a particular task upon an indication of the significant occurrence;

associating the significant occurrence with the service entity, the association including a generic reference applicable to a plurality of service entities, the association further operable to selectively enable a module including the service entity upon the significant occurrence, the association further being a persistent association independent of enabling and disabling of the service entity; storing, in a global association table, an indication of the significant occurrence and an indication of the module containing the service entity, the global association table persistently independent of enablement of the module including the service entity corresponding to the significant occurrence;

receiving the indication of the significant occurrence;

determining, via the association, the corresponding service entity and the module including the service entity;

selectively enabling the module including the service entity to activate the service entity; and dispatching the service entity to execute and complete the time based task, the persistent association being defined by a set of tables including the association, the set of tables for traversing the published significant occurrence from the detecting class entity to the service entity to be invoked as a result of the significant occurrence, at least one of the set of tables being a persistent table, the persistent table remaining active beyond the activation of the service entity.

18. The method of claim 17 wherein the associating is performed by an association entry, the association entry further comprising a global entry and a local entry including an indication of the particular task.

19. The method of claim 18 wherein the global entry is operable to trigger enablement of the module including the local entry if the module is not enabled upon the notification of the significant occurrence.

20. A services architecture for interprocess communication in a managed information system comprising:

a module server stored in memory operable to receive a registration from a service entity in the managed information system, the registration indicative of a significant occurrence in the managed information system and the service entity responsive to the significant occurrence;

a service provider in the module server operable to establish a persistent association of the service entity and the significant occurrence in response to the registration, the persistent association independent of the enablement of the service entity, the persistent association providing a registered service entity for the service provided by the service entity, the persistent association independent of enabling and disabling of the service entity;

an association mapping for storing the persistent association and adapted to map a received notification indicative of the significant occurrence in the managed information system, the service operable to identify, via the persistent association, the corresponding registered service entity responsive to the significant occurrence, the association mapping including a global association table, having an indication of the significant occurrence and an indication of the module containing the service entity, the global association table persistently independent of enablement of the module including the service entity corresponding to the significant occurrence; and an activation manager operable to enable, if the identified registered service entity is disabled, a module including the service entity to activate the service entity, the module server operable to invoke, via the persistent association, the service entity responsive to the significant occurrence, the persistent association being defined by a set of tables including the association, the set of tables for traversing the published significant occurrence from the detecting class entity to the service entity to be invoked as a result of the significant occurrence, at least one of the set of tables being a persistent table, the persistent table remaining active beyond the activation of the service entity.

21. The services architecture of claim 20 wherein the module server is in communication with a class entity adapted to detect the significant occurrence, and further operable to transmit an indication message indicative of the significant occurrence to the module server.

22. The services architecture of claim 20 further comprising an activation manager, the activation manager operable to:
- disable the module including the service entity; and
- selectively enable, in response to the significant occurrence, the module including the service entity, wherein the persistent association is independent of enabling and disabling of the service entity.

23. The services architecture of claim 20 wherein the module server is further operable to:
- enqueue an indication of the significant occurrence a queue, the queue corresponding to the process including the module containing the service entity; and
- assign, to a thread corresponding to the queue, performance of the service entity corresponding to the significant occurrence.

24. The services architecture of claim 20 wherein the received registration includes a genericizing reference for identifying the service entity, the genericizing reference adapted to avoid extraneous references and further operable for registration of a plurality of service entities, each of the service entities independent of references of other of the plurality of service entities.

25. The services architecture of claim 20 wherein the module server is further operable to invoke the service entity in a different executable entity than the significant occurrence, and further operable to transmit the indication message from the process corresponding to the significant occurrence to the module including the service entity corresponding to the significant occurrence.

26. The services architecture of claim 20 wherein the module server is further operable to
- identify associated data indicative of the significant occurrence;
- assembling an invocation call, the invocation call including a reference to the service entity and a reference to the identified associated data; and
- execute the referenced service entity in the context of the referenced associated data.

27. The services architecture of claim 26 wherein module server is further operable to execute a dispatch command, the dispatch command operative to enqueue multiple invocations to the same service entity, wherein the dispatch command references the associated data via a genericizing reference, the genericizing reference operable to include multiple types of associated data independently of the dispatched service entities employing the associated data.

28. The services architecture of claim 20 further comprising a memory/heap manager operable to identify, in a memory portion operable for dynamic allocation, an allocation adapted to store the notification indicative of the significant occurrence, the memory/heap manager further operable to tracking references to the allocation, and to deallocate, following execution of the service entity corresponding to the significant occurrence, the allocation, the deallocation occurring in the same identified memory portion.

29. The services architecture of claim 20 further comprising a global association table operable to store the persistent association including an indication of the significant occurrence and an indication of the module containing the service entity, the global association table persistently independent of enablement of the module including the service entity corresponding to the significant occurrence.

30. The services architecture of claim 20 further comprising storing a local association table adapted to store an indication of the significant occurrence and an indication of the service entity corresponding to the significant occurrence.

31. The services architecture of claim 20 wherein the service entities are handlers corresponding to executable methods and the indication messages are events propagated by an invocation mechanism as a result of the significant occurrence Service entity.

32. A computer program product having a computer readable storage medium operable to store computer program logic embodied in computer program code encoded thereon that, when executed by a processor responsive to instructions in the computer program code case the computer to perform a method for interprocess communication in a managed information architecture, the method comprising:
- receiving a registration from a service entity in the managed information architecture, the registration indicative of a significant occurrence in the managed information architecture and the service entity responsive to the significant occurrence;
- establishing a persistent association of the service entity and the significant occurrence in response to the registration, the persistent association independent of the enabling and disabling of the service entity, the persistent association providing a registered service entity, further including storing, in a global association table, and indication of the significant occurrence and an indication of the module containing the service entity, the global association table persistently independent of enablement of the module including the service entity corresponding to the significant occurrence;
- receiving a notification indicative of the significant occurrence in the managed information architecture;
- identifying, via the persistent association, the corresponding registered service entity responsive to the significant occurrence;
- enabling, if the identified registered service entity is disabled, a module including the service entity to activate the service entity; and
- invoking, via the persistent association, the service entity responsive to the significant occurrence, the persistent association being defined by a set of tables including the association, the set of tables for traversing the published significant occurrence from the detecting class entity to the service entity to be invoked as a result of the significant occurrence, at least one of the set of tables being a persistent table, the persistent table remaining active beyond the activation of the service entity.

33. A services architecture for interprocess communication in a managed information architecture comprising:
- a module server stored in memory;
- means for receiving a registration from a service entity in the managed information architecture, the registration indicative of a significant occurrence in the managed information architecture and the service entity responsive to the significant occurrence;
- means for establishing a persistent association of the service entity and the significant occurrence in response to the registration, the persistent association independent of the enablement of the service entity and independent of enabling and disabling of the service entity, the persistent association providing a registered service entity, further including means for storing, in a global association table, an indication of the significant occurrence and an indication of the module containing the service entity, the global association table persistently independent of enablement of a module including the service entity corresponding to the significant occurrence;

means for receiving a notification indicative of the significant occurrence in the managed information architecture;

means for identifying, via the persistent association, the corresponding registered service entity responsive to the significant occurrence;

means for enabling, if the identified registered service entity is disabled, a module including the service entity to activate the service entity; and means for invoking, via the persistent association, the service entity responsive to the significant occurrence, the persistent association being defined by a set of tables including the association, the set of table for traversing the published significant occurrence from the detecting class entity to the service entity to be invoked as a result of the significant occurrence, at least one of the set of tables being a persistent table, the persistent table remaining active beyond the activation of the service entity.

34. A method for interprocess communication in a managed information architecture comprising:

receiving a registration from a service entity in the managed information architecture, the registration indicative of a significant occurrence in the managed information architecture and the service entity responsive to the significant occurrence;

establishing a persistent association of the service entity and the significant occurrence in response to the registration, the persistent association independent of the enabling and disabling of the service entity, the persistent association providing a registered service entity;

receiving a notification message indicative of the significant occurrence in the managed information architecture;

identifying, via the persistent association, the corresponding registered service entity responsive to the significant occurrence;

enabling, if the identified registered service entity is disabled, a module in the module server including the service entity, wherein the service entities are handlers corresponding to executable methods and the indication messages are events propagated by an invocation mechanism as a result of the significant occurrence service entity; and invoking, via the persistent association, the service entity responsive to the significant occurrence, invoking further comprising:

identifying associated data indicative of the significant occurrence; assembling an invocation call, the invocation call including a reference to the service entity and a reference to the identified associated data; and executing the referenced service entity in the context of the referenced associated data to activate the service entity, executing further comprising a dispatch command, the dispatch command specific to the handler responsive to the significant occurrence and operative to enqueue multiple invocations to the same service entity, the persistent association being defined by a set of tables including the association, the set of tables for traversing the published significant occurrence from the detecting class entity to the service entity to be invoked as a result of the significant occurrence, at least one of the set of tables being a persistent table, the persistent table remaining active beyond the activation of the service entity.

* * * * *